(12) United States Patent
Bauver, II et al.

(10) Patent No.: US 9,695,934 B2
(45) Date of Patent: Jul. 4, 2017

(54) NOZZLE AND NOZZLE ASSEMBLY CONFIGURED TO MINIMIZE COMBINED THERMAL AND PRESSURE STRESS DURING TRANSIENTS

(75) Inventors: Wesley P. Bauver, II, Granville, MA (US); Donald W. Bairley, Farmington, CT (US); Ian J. Perrin, North Granby, CT (US); Glenn T. Selby, West Simsbury, CT (US); Rahul J. Terdalkar, Bloomfield, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 125 days.

(21) Appl. No.: 13/169,490

(22) Filed: Jun. 27, 2011

(65) Prior Publication Data
US 2012/0325940 A1 Dec. 27, 2012

(51) Int. Cl.
A62C 31/02 (2006.01)
F16J 12/00 (2006.01)

(52) U.S. Cl.
CPC .................... *F16J 12/00* (2013.01)

(58) Field of Classification Search
CPC ....................................................... F17C 1/00
USPC ........................................... 239/589; 73/788
See application file for complete search history.

(56) References Cited

U.S. PATENT DOCUMENTS

| 2,015,246 | A | * | 9/1935 | Taylor | F16L 41/084 219/137 R |
| 2,981,556 | A | * | 4/1961 | Jackson | F16L 41/084 285/189 |
| 3,026,130 | A | * | 3/1962 | Morrell | F16L 41/084 219/137 R |
| 3,274,671 | A | * | 9/1966 | Hauer | B21K 21/00 220/4.12 |
| 3,456,831 | A | * | 7/1969 | Johansson | B01J 3/04 220/581 |
| 3,655,085 | A |   | 4/1972 | Aleck |  |
| 3,934,787 | A | * | 1/1976 | Fels | F16L 41/084 228/184 |
| 4,892,702 | A | * | 1/1990 | Vignes | B23K 15/0093 376/294 |
| 5,056,704 | A | * | 10/1991 | Martin | F16L 41/082 228/173.4 |

FOREIGN PATENT DOCUMENTS

| DE | 23 27 700 | 12/1974 |
| DE | 23 58 295 | 6/1975 |
| FR | 2 459 923 | 1/1981 |
| JP | 60 065957 | 4/1985 |

* cited by examiner

*Primary Examiner* — Arthur O Hall
*Assistant Examiner* — Joel Zhou
(74) *Attorney, Agent, or Firm* — GE Global Patent Operation; Stephen G. Midgley

(57) ABSTRACT

In a nozzle and a nozzle assembly, for use in a pressure vessel, stress analysis is used to determine areas of stress concentration. The nozzle is configured to reduce these stress concentrations.

7 Claims, 6 Drawing Sheets

NOZZLE AND NOZZLE ASSEMBLY CONFIGURED TO MINIMIZE COMBINED THERMAL AND PRESSURE STRESS DURING TRANSIENTS

FIELD OF THE INVENTION

The present invention is generally related to nozzles for use in pressure vessels and is more particularly directed to nozzles wherein portions thereof are contoured to minimize stress.

BACKGROUND

Pressure vessels, such as, for example, boiler drums are typically subjected to cyclic thermal and mechanical stresses due to changes in internal fluid pressure and temperature. These cyclic stresses can limit the number and/or magnitude of pressure and/or temperature cycles that the pressure vessels can withstand. Historically, pressure vessels have bores, or penetrations extending through the shell of the pressure vessel. Conduits such as pipes are attached to the pressure vessel such that the penetration and the pipes are in fluid communication with one another to allow for the ingress and egress of fluids to and from the pressure vessel. Stress concentrations exist at the intersection of the pipe(s) and the shell of the pressure vessel. These stress concentrations result in higher stresses and often become a limiting factor in the design of the pressure vessel for phenomena such as fatigue and/or cracking of the magnetite layer that can form on the metal surface, and which may limit the useful lifetime.

SUMMARY

The present disclosure resides in one aspect in a nozzle assembly for use in a pressure vessel such as a boiler. The pressure vessel includes a wall having an inner wall surface that defines an interior area. At least one aperture extends through a thickness defined by the wall. A nozzle is positioned in at least one aperture and includes a body portion having a bore extending there through and in communication with the interior area of the pressure vessel. The nozzle includes an end portion defined by a radius extending circumferentially around the end portion, the radius being substantially tangent to a contour defined by the inner surface pressure vessel wall.

In an embodiment, the nozzle further comprises an integral flange extending outwardly from the body portion of the nozzle. The flange has an outer surface defining a contour substantially tangent to a contour defined by the outer surface of the pressure vessel wall and an inner surface defining a contour substantially tangent to the inner surface of the pressure vessel wall. The above-described radius defined by the end portion of the nozzle is substantially tangent to the inner and/or outer surface of the flange and thereby substantially tangent to the contour defined by the inner and/or outer surface of the pressure vessel wall.

While the above-described embodiment has been described as including a radius defined by the end portion of the nozzle, the description is not limited in this regard as the nozzle can include a flange without an end portion radius. The nozzle may also include a second radius extending between the flange and the body portion of the nozzle, with the radius being substantially tangent to a contour of the upper surface defined by the flange.

The present disclosure sets forth in another aspect, a method for configuring a nozzle assembly for use in a pressure vessel. In the method, the stresses induced during operation due to pressure and temperature in the pressure vessel are determined using finite element analysis (FEA) or some other appropriate stress analysis method or technique. In particular, the magnitude of stress concentration at an intersection formed between the nozzle and an inner surface of the pressure vessel wall is determined Based on the stress analysis results, a radius geometry defined by the nozzle is determined The radius is located such that it is substantially tangent to the interior and/or exterior wall defined by the pressure vessel. Optionally an integral flange may be included to provide separation between the radius and the junction to the vessel. The radius is sized to reduce stress concentrations at the intersection due to cyclic temperature and pressure loads in the interior of the pressure vessel. However, the present disclosure is not limited in this regard as the nozzle can be configured to include a flange without the above-described radius. In either case, the flange is sized based on stress analysis such that the area where the nozzle is welded to the pressure vessel is outside the areas of high stress. In an embodiment described herein, the pressure vessel is a boiler drum.

DETAILED DESCRIPTION

Figure 1:
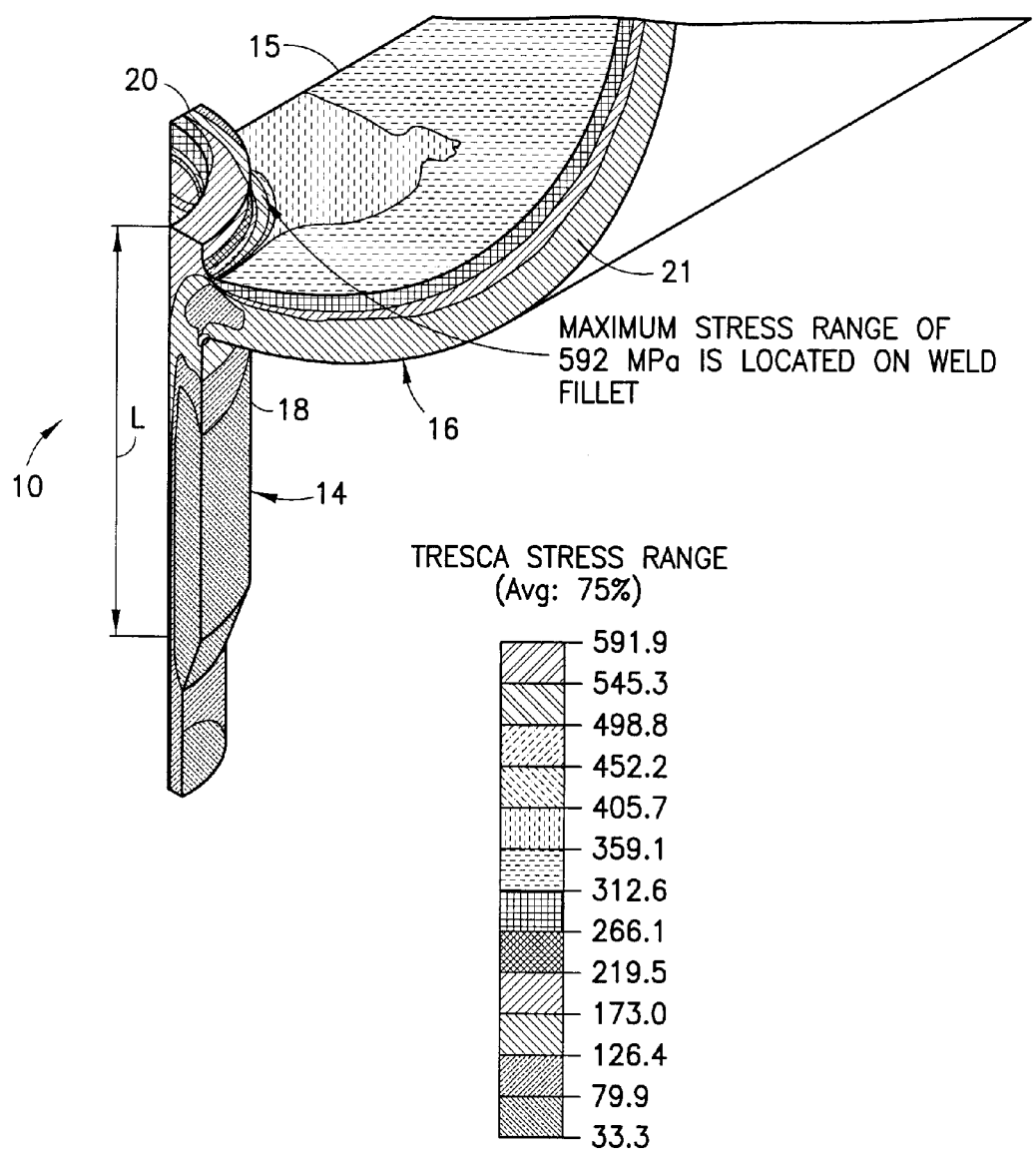
FIG. 1 is a finite element analysis stress contour plot showing a prior art nozzle installed in a pressure vessel subjected to cyclic temperature and pressure loads typically found in a boiler drum used in a heat recovery steam generator.

As shown in FIG. 1, the results of a finite element analysis, in the form of a stress contour plot of a cut-away view of a portion of a nozzle assembly, are shown and are generally designated by the reference number 10. The stress contour plot 10 depicts areas of varying stress, the stress contours being superimposed over a section of a known prior art nozzle assembly generally designated by the reference number 10. The nozzle assembly 10 includes a nozzle 14 that extends through an aperture and into an interior area 15 defined by a pressure vessel wall 16. In the illustrated embodiment the area of maximum stress is located at the intersection defined between the nozzle 14 and an interior surface of the pressure vessel wall 16. The nozzle 14 includes a cylindrical body portion 18 having a constant diameter along a length "L" that extends to an end portion 20 of the nozzle. In general, the nozzle 14 is attached to the pressure vessel 16 via welding. Since the intersection between the interior wall 21 of the pressure vessel 16 and the nozzle body 18 defines a substantially sharp corner, the stress concentration at this point is high. As shown in FIG. 1, for a particular geometry the maximum stress range induced at the above-described intersection for a given history of temperatures and pressures within the pressure vessel is 592 MPa (Megapascals).

Figure 2:
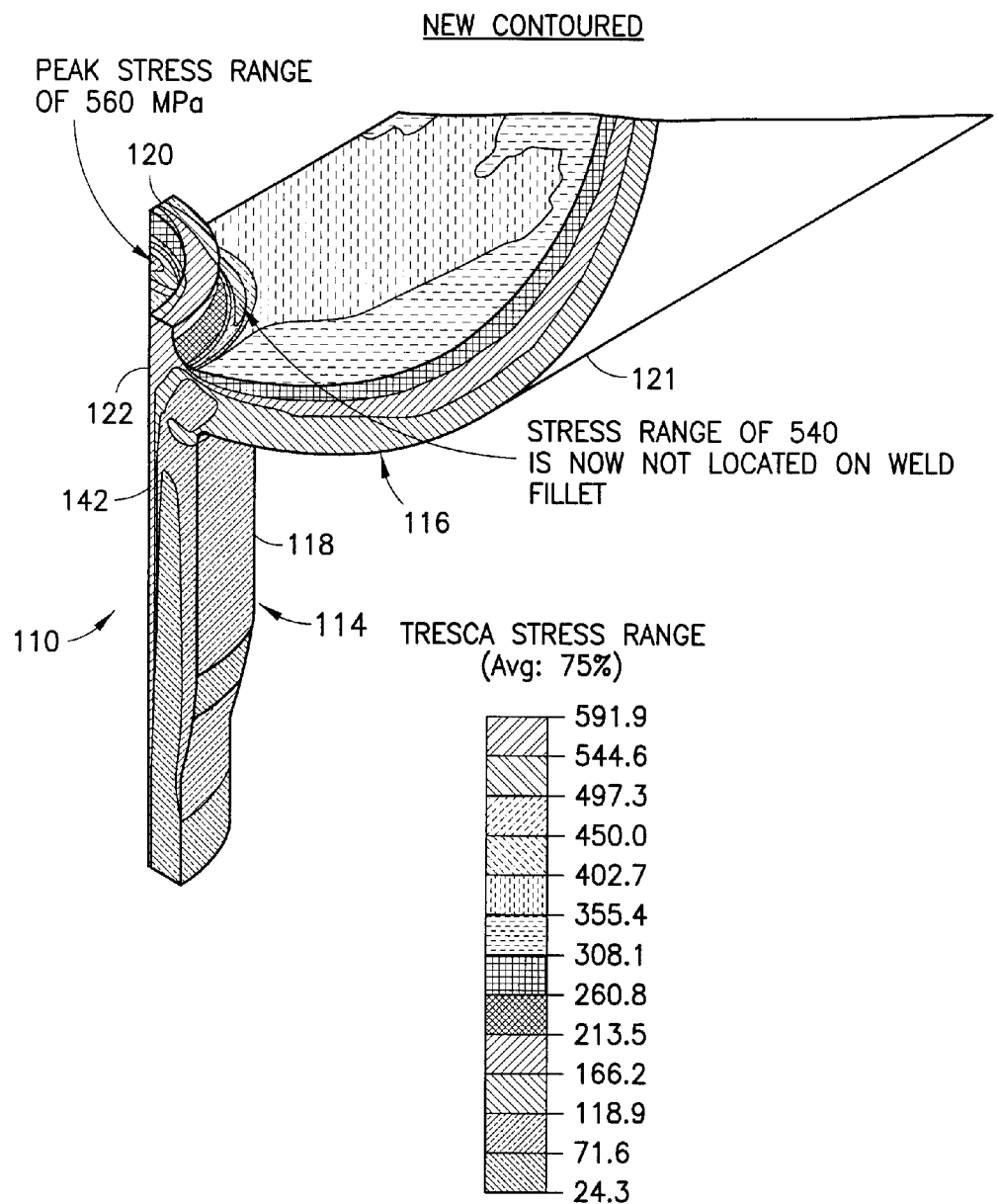
FIG. 2 is a finite element analysis stress contour plot showing an embodiment of a nozzle as described herein installed in a pressure vessel subjected to cyclic temperature and pressure loads typically found in a boiler drum used in a heat recovery steam generator.
Figure 3:
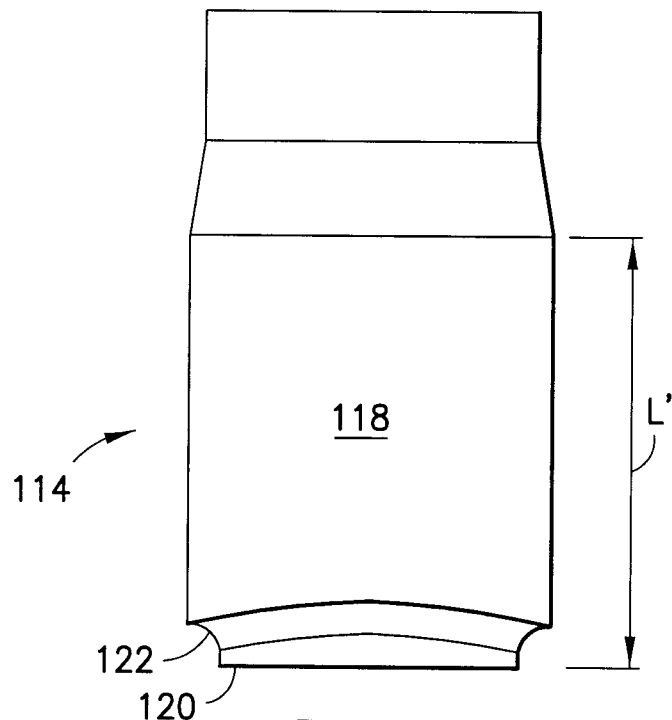
FIG. 3 is a side elevational view of an embodiment of a nozzle as disclosed herein.
Figure 4:
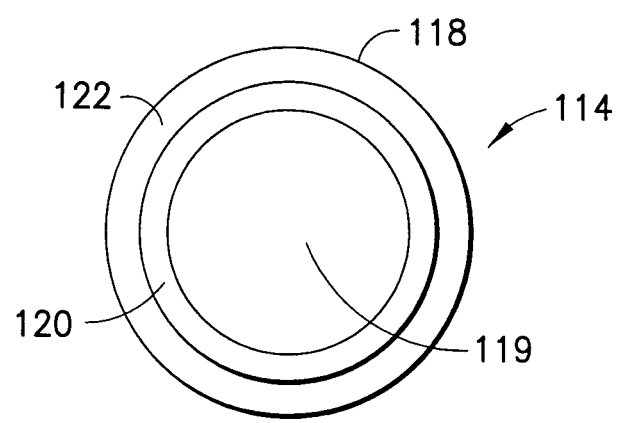
FIG. 4 is a bottom view of the nozzle of FIG. 3.
Figure 5:
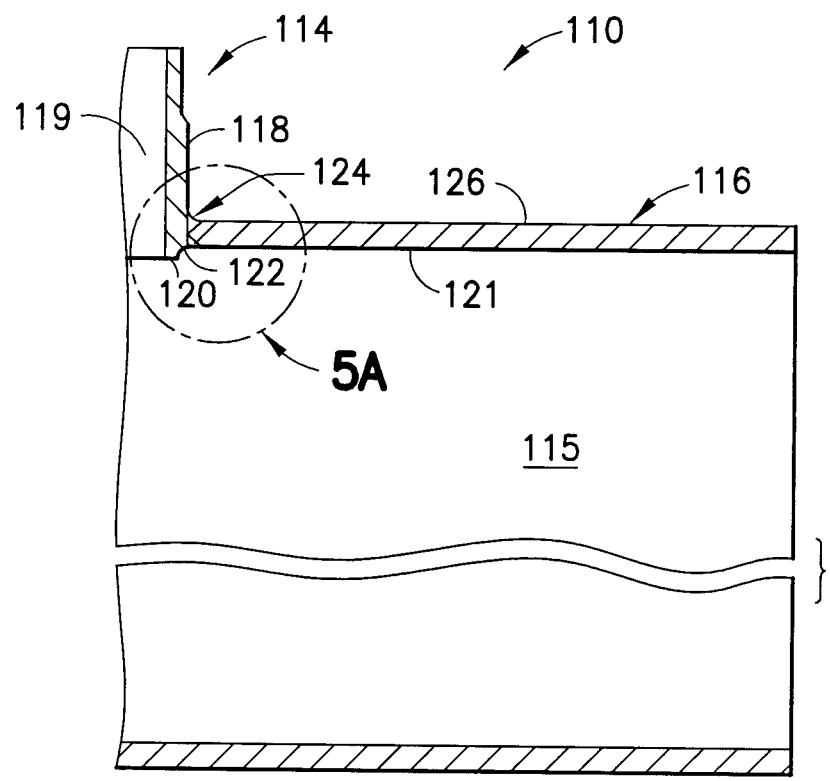
FIG. 5 is a partial cross-sectional view of a nozzle assembly showing the nozzle of FIG. 2 installed in a pressure vessel.

Turning to FIG. 2, a nozzle assembly 110 in accordance with the present invention includes a nozzle 114 attached to a pressure vessel 116. The nozzle assembly 110 is similar to the nozzle assembly 10. Accordingly, like elements will be assigned like reference numbers preceded by the numeral 1. The nozzle 114, best seen in FIGS. 3 and 4, includes a body portion 118 defined in part by a length L' extending to a bottom portion 120 of the nozzle. A bore 119 extends through the nozzle 114 and when the nozzle is installed on the pressure vessel 116, best seen in FIG. 5, the bore 119 is in communication with the interior area 115 of the pressure vessel. The body portion 118 of the nozzle 114 includes a substantially cylindrical portion of substantially constant diameter extending part-way along the length L'. Adjacent to the bottom portion 120 of the nozzle 114, the body portion 118 defines a radius 122. In the illustrated embodiment, the radius 122 is substantially tangent to the inner wall of the pressure vessel 121. In addition, the nozzle assembly 110 includes an outer radius 142 extending between the nozzle body 118 and an outer surface of the pressure vessel 116. Depending on the nozzle configuration, the outer radii 142 may be formed from welded material and then ground, or the outer radius may be machined into the nozzle itself. However, the present invention is not limited in this regard as an outer radius 142 may also be omitted from the nozzle assembly.

Referring back to FIG. 2, finite element or other stress analysis is used to determine the size and configuration of the radius 122 that will result in the stresses due to temperature and pressure within the nozzle and at the intersection of the nozzle 114 and the inner surface 121 of the pressure vessel wall 116 to be within desired levels. The nominal vessel geometry and temperature and pressure history within the pressure vessel 116 used to calculate, via finite element analysis, the stresses displayed in FIG. 2, are the same as those used to determine the stresses displayed in FIG. 1. The primary difference between the nozzle assembly 10 shown in FIG. 1 and the nozzle assembly 110 shown in FIG. 2 is that the nozzle assembly 110 includes the radius 122 in the lower portion of the nozzle body. In using finite element or other stress analysis to optimize the radius 122 and thereby the configuration of the nozzle 114 when installed in the pressure vessel 116, a significant reduction in the stress level within the nozzle and at the intersection of the nozzle and the inner surface 121 of the pressure vessel wall is realized. The location of the highest stress range is now no longer located in the weld, which is often a region of inherent weakness and which may require application of a fatigue strength reduction factor, or some other notch factor, to account for this inherent weakness. Therefore, it is advantageous to ensure that the location of high stress is not coincident with a weld. In the illustrated embodiment the stress range at the intersection dropped from 592 MPa as shown in FIG. 1, to 540 MPa as shown in FIG. 2.

Figure 5A:
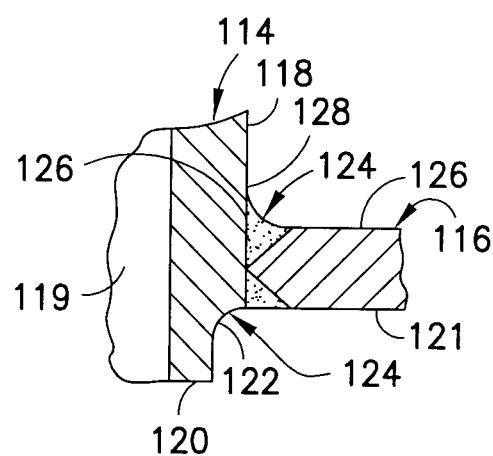
FIG. 5A is an enlarged partial view of the nozzle assembly of FIG. 2.

As shown in FIG. 5A, the nozzle 114 is secured to the pressure vessel 116 via welds 124. In the illustrated embodiment, the aperture 126 extending through the pressure vessel wall 116 and through which the nozzle 114 extends, is configured to be V-Shaped 126. This v-shape 126 allows for sufficient welding material to be applied to adequately secure the nozzle 114 to the pressure vessel 116. While a v-shape 126 has been shown and described, the present invention is not limited in this regard as other shaped portions of the pressure vessel wall may be employed, such as, but not limited to, a rounded convex or concave shape, without departing from the broader aspects of the present invention. In addition, the weld 124, extending between an outer surface 126 of the pressure vessel wall and the nozzle body 118 may define a radius 128. In the illustrated embodiment, the radius 128 is substantially tangent to the outer surface 126 of the pressure vessel wall, as well as to the nozzle body 118.

Figure 6:
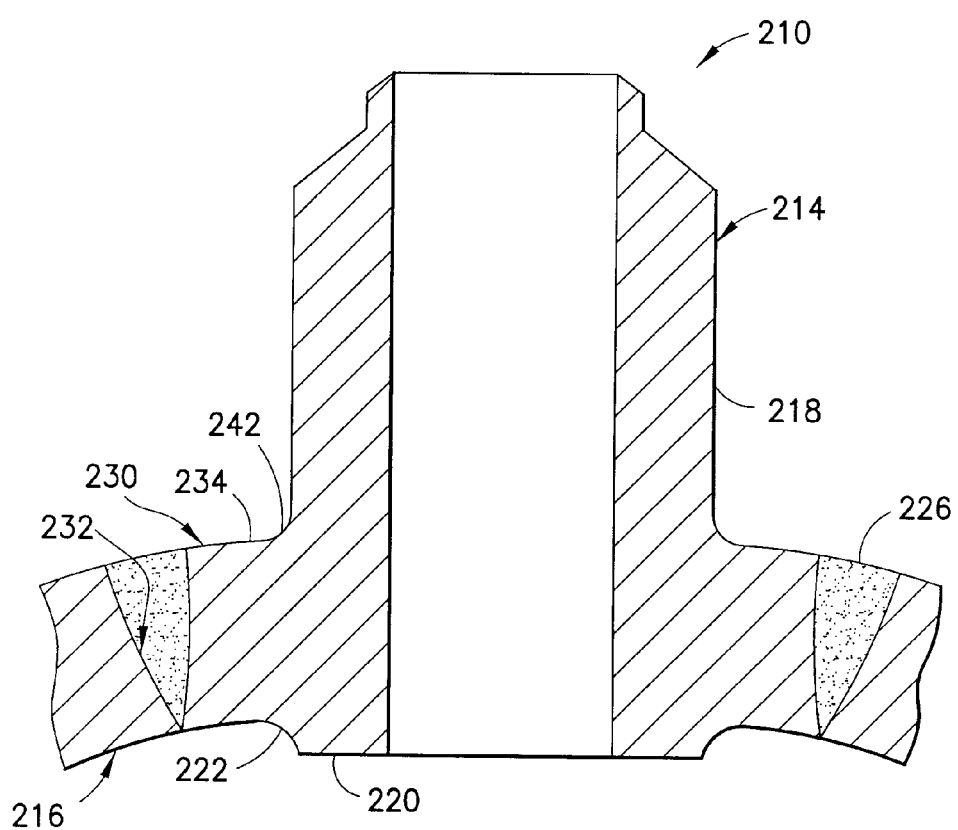
FIG. 6 is a cross sectional view another embodiment of a nozzle assembly as disclosed herein showing an alternate embodiment of a nozzle installed in a pressure vessel.

Referring to FIG. 6, an alternate embodiment of the above-described nozzle assembly is shown and is generally designated by the reference number 210. The nozzle assembly 210 is similar to the nozzle assembly 110 and therefore, like elements will be given like reference numbers preceded by the numeral 2. The nozzle assembly 210 includes a nozzle 214 having a substantially cylindrical body portion 218 and a flange 230 extending from the substantially cylindrical body portion. The lower portion 220 of the nozzle 214 includes a radius 222 extending between the lower portion 220 and an underside of the flange 230. In the illustrated embodiment, the radius 222 is substantially tangent to the underside of the flange 230. The flange 230 is shaped to follow the contour defined by the pressure vessel 216 wall. The nozzle 214 is positioned in an aperture 226 defined by the pressure vessel 216. Once positioned therein, the nozzle flange 230 and the pressure vessel 216 cooperate to define a pocket there between for accepting weld 232 therein to secure the nozzle to the pressure vessel. While a weld pocket 232 has been shown and described, the present invention is not limited in this regard as any practical weld configuration can be employed without departing from the broader aspects of the invention. The radius 222 acts to reduce stress concentrations in the same manner as the above-described radius 122, thereby allowing longer useful lives and/or the ability for pressure vessels, such as, but not limited to boilers in heat recovery steam generators to operate at higher temperatures and pressures. Based on stress analysis, the size of the flange is such that the weld area is outside of the areas of high stress.

As shown in the illustrated embodiment, a radius 242 extends between an upper surface 234 of the flange 230, and the nozzle body 218. However, the present invention is not limited in this regard as the intersection defined by the nozzle body and the upper surface 234 of the flange does not have to define a radius.

Figure 7:
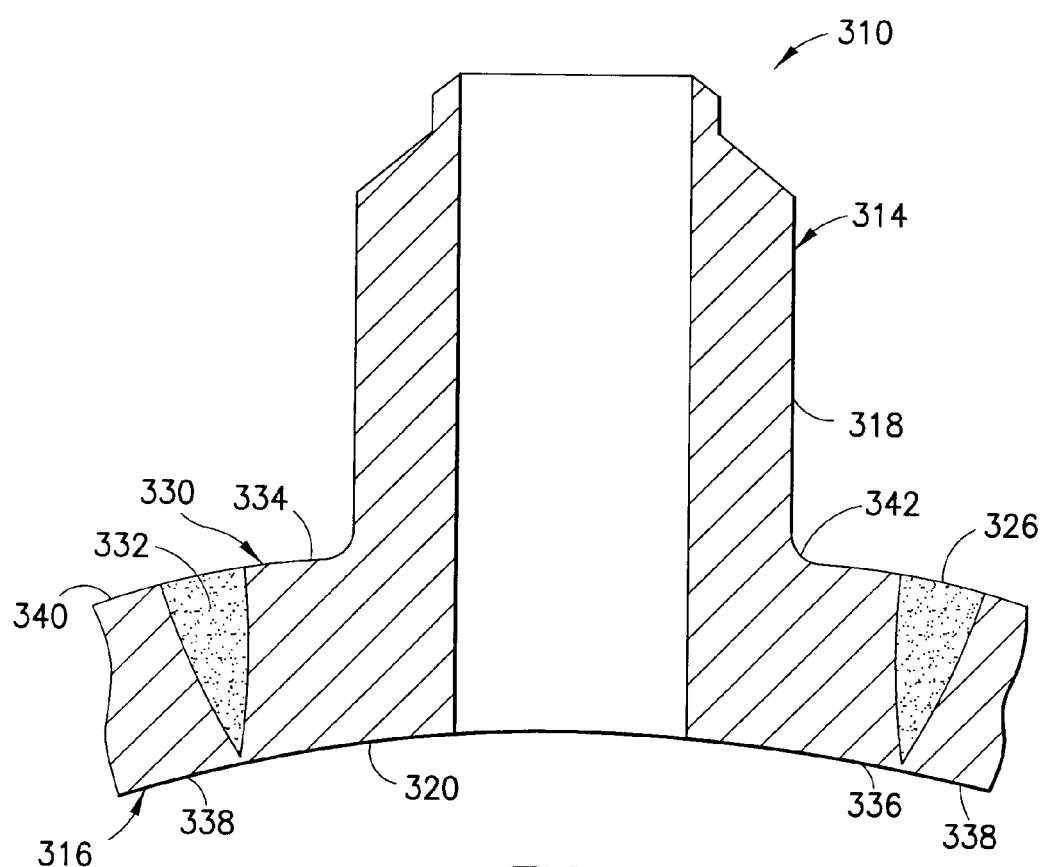
FIG. 7 is a cross sectional view of an alternative embodiment of FIG. 6.

As shown in FIG. 7, a nozzle assembly 310 includes a nozzle 314 coupled to a pressure vessel 316. The nozzle assembly 310 is similar to the above-described nozzle assembly 210 and therefore like elements will be given like reference numbers preceded by the numeral 3. The nozzle 314 includes a cylindrical body portion 318. A flange 330 extends outwardly from the body portion 318 and includes an upper surface 334 and a lower surface 336.

In the illustrated embodiment, the lower surface 336 of the flange 330 is substantially tangent to an inner surface 338 of a wall defined by the pressure vessel 316. Similarly, the upper surface 334 of the flange 330 is contoured, with the contour being substantially tangent to an outer surface 340, defined by the pressure vessel 316. As shown in the illustrated embodiment, a radius 342 extends between the upper surface 334 of the flange, and the nozzle body 318. However, the present invention is not limited in this regard as the intersection defined by the nozzle body and the flange does not have to define a radius.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A nozzle assembly for use in a pressure vessel, the nozzle assembly comprising:
    a pressure vessel having a wall, an inner arcuate surface of which defines an interior area with at least one aperture extending through a thickness defined by the wall, and an outer surface; and
    a nozzle positioned in the at least one aperture, the nozzle defining a bore extending there through and in communication with the interior area of the pressure vessel; the nozzle including:
        a body portion having an outer diameter; and
        an end portion extending from one end of the body portion and having an outer diameter less than the outer diameter of the body portion, the end portion of the nozzle having a radius that defines an arcuate transition between the body portion and the end portion and extends circumferentially around the end portion, the end portion extending into the interior of the interior of the vessel with the radius being substantially tangent to a contour defined by the inner arcuate surface of the pressure vessel wall;
    wherein the nozzle assembly has second radius that defines an arcuate transition at an intersection formed by the outer arcuate surface of the pressure vessel wall and the body portion of the nozzle, the second radius being substantially tangent to the Body portion and to a contour defined by the outer arcuate surface of the pressure vessel wall; and
    wherein the at least one aperture is defined by an aperture wall having a generally V-shaped cross-section forming an apex configured to receive the body portion of the nozzle adjacent to the end portion, the apex defining a first recess and a second recess on opposed sides of the apex for receiving first and second welds, respectively, for securing the nozzle to the pressure vessel.

2. The nozzle assembly as defined by claim 1, wherein the second radius is defined by the second weld and formed by grinding the second weld.

3. The nozzle assembly as defined by claim 1, wherein the body portion of the nozzle further comprises:
    a flange extending outwardly from the body portion of the nozzle, the flange having an outer surface defining a contour substantially tangent to a contour defined by the outer arcuate surface of the pressure vessel and an inner surface defining a contour substantially tangent to the inner arcuate surface of the pressure vessel wall; and
    the radius defined by the end portion of the nozzle being substantially tangent to the inner surface of the flange.

4. The nozzle assembly as defined by claim 1, wherein the body portion is cylindrical having a length greater than the thickness of the wail of the pressure vessel.

5. The nozzle assembly as defined by claim 4, wherein the outer diameter of the body portion is substantial the same as a diameter of the thickness of the wall of the pressure vessel.

6. The nozzle assembly as defined by claim 3, wherein the radius defined by the end portion of the nozzle body portion being substantially tangent to the inner surface of the flange.

7. The nozzle assembly as defined by claim 1, wherein the radius of the end portion and the body portion defined a circumferential edge disposed in an arcuate plane.

* * * * *